(12) United States Patent
Han et al.

(10) Patent No.: US 11,553,499 B2
(45) Date of Patent: Jan. 10, 2023

(54) EXCHANGE OF UL INTERFERENCE DETECTION RELATED INFORMATION

(71) Applicant: Lenovo (Beijing) Limited, Beijing (CN)

(72) Inventors: Jing Han, Beijing (CN); Lianhai Wu, Beijing (CN); Haiming Wang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 287 days.

(21) Appl. No.: 16/764,632

(22) PCT Filed: Nov. 15, 2017

(86) PCT No.: PCT/CN2017/111130
§ 371 (c)(1),
(2) Date: May 15, 2020

(87) PCT Pub. No.: WO2019/095150
PCT Pub. Date: May 23, 2019

(65) Prior Publication Data
US 2020/0404676 A1 Dec. 24, 2020

(51) Int. Cl.
*H04W 4/00* (2018.01)
*H04W 72/08* (2009.01)
(Continued)

(52) U.S. Cl.
CPC ......... *H04W 72/082* (2013.01); *H04L 5/0073* (2013.01); *H04W 24/08* (2013.01); *H04W 52/146* (2013.01)

(58) Field of Classification Search
CPC . H04W 72/082; H04W 24/08; H04W 52/146; H04W 72/0406; H04W 92/20; H04W 24/02; H04L 5/0073
(Continued)

(56) References Cited

U.S. PATENT DOCUMENTS 6,850,486 B2   2/2005  Saleh et al.
8,942,749 B2 * 1/2015  Kwon ................... H04L 5/0073
                                                        455/522
(Continued)

FOREIGN PATENT DOCUMENTS

CN   101651879 A      2/2010
CN   103391581 A  *  11/2013
(Continued)

OTHER PUBLICATIONS

Interdigital, Detection of UAV Interference, 3GPP TSG-RAN WG2 Meeting #99 R2-1708734, Aug. 21-25, 2017, pp. 1-4, Berlin, Germany.
(Continued)

*Primary Examiner* — Thai D Hoang
(74) *Attorney, Agent, or Firm* — Kanzler Bean & Adamson

(57) ABSTRACT

Method, base station and control node for exchanging UL interference detection related information are disclosed. A method of exchanging UL interference detection related information among base stations, the method comprising: receiving the UL interference detection related information and distribution information distributed from a first base station; updating the distribution information; checking whether to transmit the UL interference detection related information to other base stations based on the updated distribution information; and transmitting or stopping transmitting the UL interference detection related information according to the checking result.

11 Claims, 6 Drawing Sheets

(51) Int. Cl.
*H04L 5/00* (2006.01)
*H04W 24/08* (2009.01)
*H04W 52/14* (2009.01)

(58) Field of Classification Search
USPC .................................. 370/329–330, 335–345
See application file for complete search history.

(56) References Cited

U.S. PATENT DOCUMENTS

| | | | |
|---|---|---|---|
| 2008/0232238 A1* | 9/2008 | Agee | H04W 52/241 370/208 |
| 2008/0233967 A1 | 9/2008 | Montojo et al. | |
| 2010/0285795 A1 | 11/2010 | Whinnett | |
| 2013/0208619 A1* | 8/2013 | Kudo | H04L 5/0053 370/252 |
| 2017/0034760 A1 | 2/2017 | Ge | |
| 2017/0339579 A1* | 11/2017 | Chu | H04W 24/02 |
| 2019/0356371 A1* | 11/2019 | Osawa | H04B 7/063 |

FOREIGN PATENT DOCUMENTS

| | | | | | |
|---|---|---|---|---|---|
| CN | 103493565 A | | 1/2014 | | |
| CN | 103582138 A | | 2/2014 | | |
| CN | 106413101 A | * | 2/2017 | ........ | H04W 72/0453 |
| CN | 108923891 A | * | 11/2018 | ............ | H03M 13/13 |
| CN | 110971312 A | * | 4/2020 | ............. | H04B 15/02 |
| CN | 112369049 A | * | 2/2021 | ........... | H04B 17/318 |
| EP | 2501189 A1 | * | 9/2012 | ............ | H04W 16/10 |
| EP | 2571315 A1 | * | 3/2013 | ............ | H04W 36/20 |
| WO | 2011035742 A1 | | 3/2011 | | |
| WO | WO-2014086035 A1 | * | 6/2014 | ............ | H04W 24/02 |

OTHER PUBLICATIONS

PCT/CN2017/111130, "International Search Report and the Written Opinion of the International Search Authority" ISA/CN, State Intellectual Property Office of the P.R. China, dated Jul. 30, 2018, pp. 1-7.

* cited by examiner

EXCHANGE OF UL INTERFERENCE DETECTION RELATED INFORMATION

FIELD

The subject matter disclosed herein generally relates to wireless communications, and more particularly relates to exchanging UL interference detection related information.

BACKGROUND

The following abbreviations are herewith defined, at least some of which are referred to within the following description: Third Generation Partnership Project ("3GPP"), Positive-Acknowledgment ("ACK" or "Ack"), Access Stratum ("AS"), Downlink ("DL"), Evolved Node B ("eNB"), Equipment Identity Register ("EIR"), Frequency Division Multiple Access ("FDMA"), Home Subscriber Server ("HSS"), Long Term Evolution ("LTE"), Multiple Access ("MA"), Mobility Management Entity ("MME"), Mobile Equipment ("ME"), Non-access Stratum ("NAS"), Next Generation Node B ("gNB"), Radio Resource Control ("RRC"), Access Network ("AN"), Radio Access Network ("RAN"), User Entity/Equipment (Mobile Terminal) ("UE"), Uplink ("UL"), Sounding Signal ("SRS"), Line-of-Sight ("LOS"), Semi-Persistent Scheduling ("SPS"), Unmanned Aerial Vehicle ("UAV"), Device to Device ("D2D"), Vehicle to Everything ("V2X"), Reference Signal Received Power ("RSRP"), Channel State Information-Reference Signal Received Power ("CSI-RSRP"), Reference Signal Received Quality ("RSRQ"), Reference Signal-Signal Interference Noise Ratio ("RS-SINR"), and Channel State Information ("CSI").

There has been increasing interest in extending cellular network coverage to include aerial vehicles such as drones. The use cases of commercial drones are growing very rapidly and include: package delivery, search-and-rescue, monitoring of critical infrastructure, wildlife conservation, flying cameras, and surveillance. All of these use cases could undergo rapid growth, and more will emerge in coming years. Many of these emerging use cases could benefit from connecting drones to cellular networks as a UE. LTE is well positioned to serve aerial vehicles such as drones. In fact, there have been an increasing number of field-trials involving the use of LTE networks to provide connectivity to drones. It is predicted that a rapid and vast growth in the drone industry will bring new promising business opportunities for LTE operators.

However, there exist problematic issues which need to be solved.

An aerial UE may interfere with a faraway base station because of line-of-sight ("LOS") propagation. LOS propagation is a characteristic of electromagnetic radiation or acoustic wave propagation which means waves which travel in a direct path from the source to the receiver. Because of the different natures of aerial UEs and legacy LTE UEs (i.e., non-aerial UEs), the aerial UE, that generally flies, may form a LOS propagation with many base stations in addition to its serving base station. Therefore, the uplink ("UL") transmission (i.e. transmission from the aerial UE) may be directed to many other base stations in addition to its serving base station. This uplink transmission to other base stations is an interference to the other base stations Information used for aerial UE UL interference detection (referred to as "UL interference detection related information") is needed for other neighbor base stations in the scenario that UL/DL reciprocity is not hold. In addition, neighbor base stations need to directly detect aerial UE UL signal. Thus the UL interference detection related information is necessary to be distributed from the serving base station of aerial UE to other neighbor base stations including those faraway base stations, so that neighbor base stations including those faraway base stations can use the information to detect whether specific aerial UE cause UL interference to themselves.

The UL interference detection related information is exchanged via the X2 interface among eNBs (base stations). However, such kind of information exchange may result problems as shown in FIG. 1. Problem 1 is signaling storm on X2 interface. That is, redundancy copies of UL interference detection related information will be received by specific eNBs from other eNBs. For example, an aerial UE may interfere with a base station that is far away from the serving eNB because of LOS propagation. In addition, it is possible that there might no X2 interface between the serving eNB and the far away eNB that would be interfered. The communication between the serving eNB and the far away eNB is necessary to be relayed by eNB(s) located in the middle of the serving eNB and the far away eNB. Because the middle eNB does not know to which eNB(s) it should distribute the UL interference detection related information, a signaling storm may be caused by unlimited information exchange. As shown in FIG. 1, the eNB labeled "Problem 1: many copies are received for specific cell" may receive three identical copies of the same "UL interference detection related information" from different eNBs. Problem 2 is that an eNB does not know when it should stop distribute the UL interference detection related information to other eNBs. As shown in FIG. 1, the eNB labeled "Problem 2: eNB does not know when to stop exchange such information" may distribute to other eNBs (not shown in FIG. 1) that do not need to receive the UL interference detection related information. These two problems might cause severe signaling storm on X2 interface.

BRIEF SUMMARY

Method, base station and control node for exchanging UL interference detection related information are disclosed.

In one embodiment, a method of exchanging UL interference detection related information among base stations comprises: receiving the UL interference detection related information and distribution information distributed from a first base station; updating the distribution information; checking whether to transmit the UL interference detection related information to other base stations based on the updated distribution information; and transmitting or stopping transmitting the UL interference detection related information according to the checking result.

In one embodiment, the UL interference detection related information and the distribution information are distributed from the first base station based on an aerial UE event. In another embodiment, the UL interference detection related information and the distribution information are distributed from the first base station periodically. Furthermore, the receiving the UL interference detection related information and the distribution information is via an X2 interface.

In one embodiment, the method comprises receiving aerial flying related information from the first base station. Preferably, the method comprises storing the UL interference detection related information and the aerial flying related information. More preferably, the transmitting the UL interference detection related information is performed with reference to the aerial flying related information.

In another embodiment, the distribution information includes distributed cell information, the distributed cell information indicates which neighbor base station has been received or is expected to receive the UL interference detection related information, and the transmitting the UL interference detection related information to other base stations comprises transmitting to neighbor base stations that have X2 interface and have not received the UL interference detection related information. In some embodiment, the distribution information includes distribution level information, the distribution level information contains a current level, and the updating the distribution information comprises increasing the current level by 1. In some embodiment, the distribution level information further contains a target distribution level, and in the condition that the current level equals to the target distribution level, the method comprises stopping transmitting the UL interference detection related information. In some embodiment, the distribution information includes a time stamp; and in the condition that a predetermined time period has elapsed from the time stamp, the method comprises stopping transmitting the UL interference detection related information. In some embodiment, the distribution information includes a time stamp and a valid timer; and in the condition that the current time exceeds the time stamp plus the valid timer, the method comprises stopping transmitting the UL interference detection related information In one embodiment, a base station comprises: a transceiver that receives UL interference detection related information and distribution information distributed from a first base station; a processor that: updates the distribution information; and checks whether to transmit the UL interference detection related information to other base stations based on the updated distribution information, wherein the transceiver transmits or stops transmitting the UL interference detection related information according to the checking result.

In another embodiment, a method of exchanging UL interference detection related information among base stations comprises receiving UL interference detection related information from at least one base station; and distributing a list of the UL interference detection related information to target base stations.

In some embodiment, the UL interference detection related information is sent from the at least one base station based on an aerial UE event. In some embodiment, the UL interference detection related information is distributed from the at least one base station periodically. In some embodiment, the receiving UL interference detection related information from at least one base station comprises receiving the UL interference detection related information from a plurality of base stations, and the method further comprises: combining the UL interference detection related information received from the plurality of base stations into an information list; and distributing the information list to the target base stations. In some embodiment, the method further comprises: receiving aerial flying related information from the at least one base station; and distributing the aerial flying related information to the target base stations.

In some embodiment, the method comprises distributing the list of the UL interference detection related information based on an aerial UE event. In other embodiment, the method comprises distributing the list of the UL interference detection related information periodically.

In some embodiment, the method comprises distributing the list of the UL interference detection related information to base stations that belong to the same TA or several TAs in a specific area. In some embodiment, the method comprises distributing the list of the UL interference detection related information to base stations that are near flying path of aerial UE. In some embodiment, the method comprises distributing the list of the UL interference detection related information to base stations that are in the area restricted by distance. In some embodiment, in the condition that the UL interference detection related information is changed, an update indication is received from the at least one base station. In some embodiment, in the condition that an aerial UE is leaving a serving base station, an UE removal indication is received from the base station.

In yet another embodiment, a control node comprises: a transceiver that: receives UL interference detection related information from at least one base station; and distributes a list of the UL interference detection related information to target base stations.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
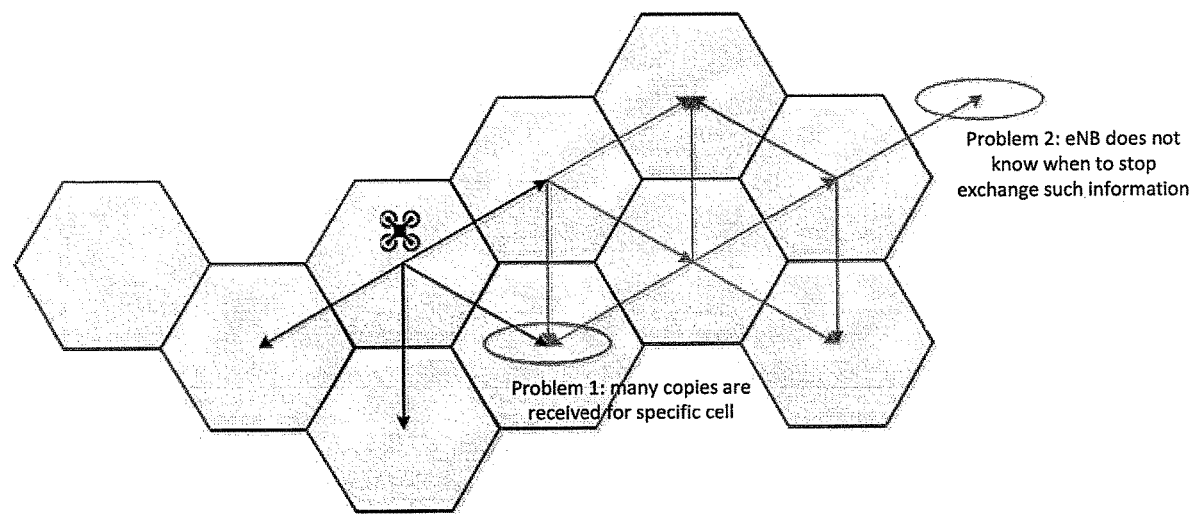
FIG. 1 is a schematic diagram illustrating existing problems.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Certain functional units described in this specification may be labeled "modules", in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory ("RAM"), read-only memory ("ROM"), erasable programmable read-only memory ("EPROM" or "Flash memory"), portable compact disc read-only memory ("CD-ROM"), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but are not limited to", unless expressly specified otherwise. An enumerated listing of items does not imply that any or all of the items are mutually exclusive, unless expressly specified otherwise. The terms "a", "an", and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams for the block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code executed on the computer or other programmable apparatus provides processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 2:
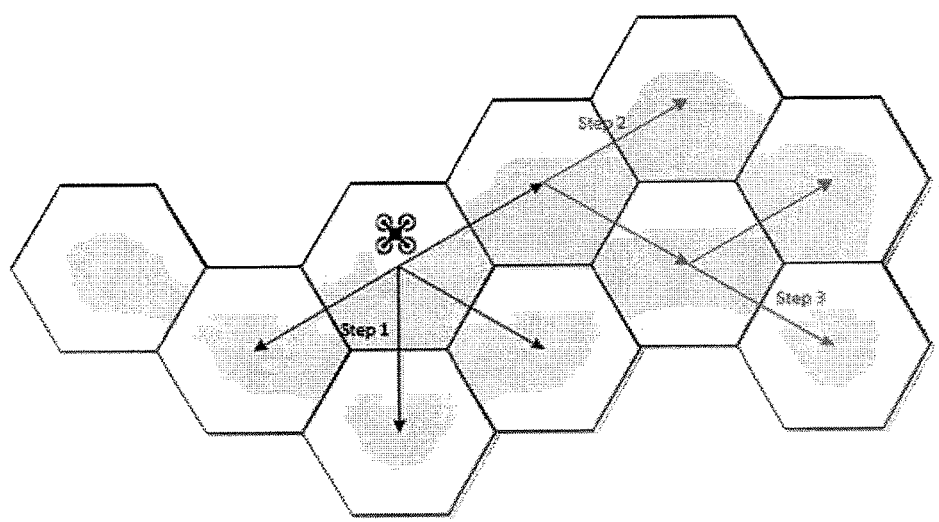
FIG. 2 is a schematic diagram illustrating one embodiment of exchanging UL interference detection related information.

FIG. 2 depicts one embodiment of exchanging UL interference detection related information. In this embodiment, the UL interference detection related information is exchanged between base stations that have X2 signaling. Middle base stations relay the UL interference detection related information between base stations that do not have X2 signaling. As a base station only distributes the UL interference detection related information, among other information, to a neighbor base station that has not been distributed by previous base stations, it is expected that no redundant copies of the same UL interference detection related information is received at a specific base station. In addition, a base station can stop distribution of the UL interference detection related information based on a time stamp or a predefined level number, that will be discussed later. The distribution of the UL interference detection related information can be further optimized by referring to aerial flying related information, such as a flying path plan of an aerial UE, that will also be discussed later.

As shown in FIG. 2, the base stations are divided into different levels. For example, a serving base station of the aerial UE is assigned as level 0. The serving base station is the base station that serves the aerial UE, including data transmission and radio configuration. The serving base station is in charge of the scheduling and configuration for aerial UE, and has aerial UE related information. The aerial UE related information includes but is not limited to UL interference detection related information and aerial flying related information. The serving base station, in step 1, distributes the UL interference detection related information and preferably the aerial flying related information to level 1 base stations that have X2 signaling with the level 0 serving base station. The level 1 base station(s), in step 2, distributes the UL interference detection related information and preferably the aerial flying related information to level 2 base stations. In step 3, the UL interference detection related information and preferably the aerial flying related information are distributed from a level 2 base station to level 3 base stations. The level 3 base station, for example, may stop distribution of the UL interference detection related information.

Figure 3:
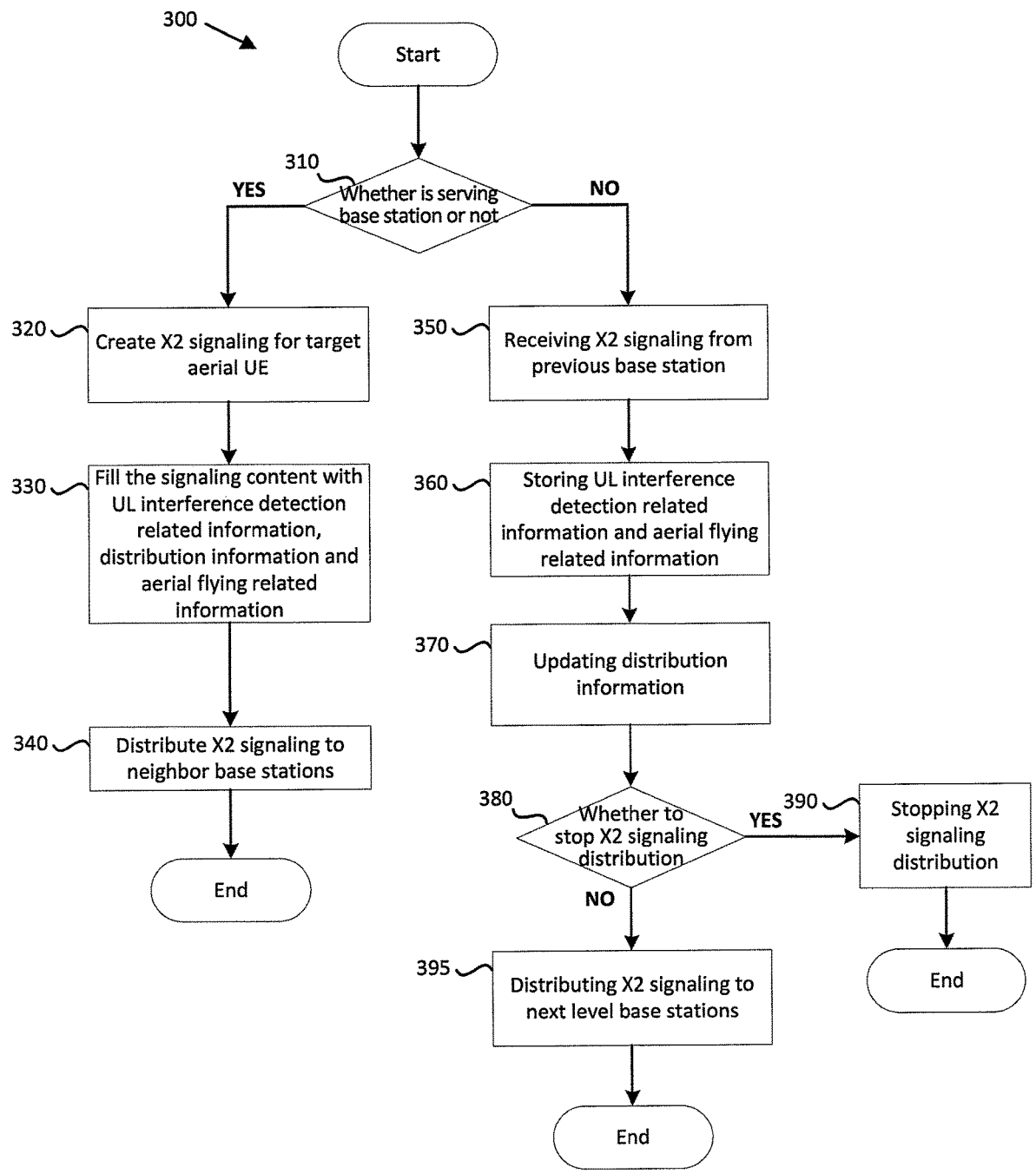
FIG. 3 is a schematic flow chart diagram illustrating one embodiment of a method of exchanging UL interference detection related information.

FIG. 3 illustrates one embodiment of a method of exchanging UL interference detection related information. FIG. 3 is a detailed implementation of the steps 1-3 shown in FIG. 2.

In step 300, the method begins. The serving base station and the other base stations (non-serving base stations) have different behaviors to distribute the UL interference detection related information. Firstly, in step 310, the method needs to check whether a base station belongs to the serving base station or not.

In the condition that the base station is the serving base station, the method goes to steps 320-340. In steps 320-340, the serving base station creates X2 signaling for a target aerial UE, fills the contents, and distributes the information to neighbor base stations (level 1 base stations). Although steps 320-340 are shown as three steps, they can be combined into one step.

In step 330, UL interference detection related information, distribution information and aerial flying related information, that may be generally referred to as assistant information, are filled.

The UL interference detection related information includes UL scheduling information for aerial UE, and such UL scheduling information can be the UL semi-persistent scheduling information which includes semi-persistent scheduling ("SPS") periodicity, SPS frequency and time resource etc. The UL interference detection related information further includes SRS frequency and time configuration of aerial UE, DL transmission power of base station, and any quantities reported by the UE, like RSRP/CSI-RSRP/RSRQ/RS-SINR/CSI.

The distribution information is the information used for choosing base stations to distribute, and the information for stopping distribution. The distribution information includes but is not limited to distributed base station information, distribution level information, time stamp information and valid timer.

The distributed base station information indicates which base station(s) have been distributed, so that when a next level base station distributes the UL interference detection related information, it can know which base station(s) have already been distributed the information and which base station(s) have not. Such information is used to avoid a neighbor base station to receive multiple same copies of the UL interference detection related information.

The distribution level information includes a current level and a total level. The current level indicates how many levels of base stations have already been distributed. For example, the current level of the serving base station can be set to 0. After the next level (level 1) base station receives the information and distributes the information, the current level will increase by 1 in value. The total level indicates how many levels of base stations are expected to distribute. When the "current level" value equals to the "total level" value, the base station that receives the information will stop the distribution. For example, when a level 3 base station receives a total level equaling 3, it will stop distributing the UL interference detection related information. Therefore, the distribution level information helps control the information distribution area, and also controls when the distribution will be stopped to avoid unlimited signaling distribution.

The time stamp information includes a time stamp indicating when the signaling was first distributed. A specific level base station can check this information and compare it with the current time to decide whether to distribute the information to the next level. For example, if a predetermined long time such as 1 hour has passed from the time stamp to the current time, the specific level base station may stop the information distribution.

The valid timer can be preferably configured in the distribution information. The valid timer indicates during how much time the signaling is valid. When the current time equals to the time stamp plus the valid timer, the specific level base station may stop the information distribution. Therefore, the time stamp and the valid timer, combined together, can also help control the information distribution area, and also control when the distribution will be stopped to avoid unlimited signaling distribution.

The aerial flying related information also helps the neighbor base stations determine how to distribute the signaling and how long the information needs to be stored. When a base station decides whether to stop distribution and to which base stations to distribute the assistant information, the distribution information and/or the aerial flying related information can be considered. The aerial flying related information includes but is not limited to velocity of aerial UE, flying path plan, flying direction and position information.

The velocity of aerial UE is flying speed of the aerial UE, which can be used to help neighbor base station determine how long the information is valid. For example, if aerial UE is flying very slow, the assistant information may be stored longer.

The flying path plan is a planned flying path of the aerial UE, which can help the neighbor base station select base stations to distribute. For example, the neighbor base station can choose to distribute information to base stations that are near the flying path.

The flying direction can help the neighbor base station select distribution base stations. For example, the neighbor base station can choose to distribute information to base stations that are in the flying direction of the aerial UE.

The position information of the aerial UE helps the neighbor base station determine whether to store and use the assistant information of aerial UE. For example, if the neighbor base station finds that the aerial UE is very far and has no UL interference potentially, the neighbor base station may choose to abandon the received assistant information.

The serving base station distributes the X2 signaling including the assistant information to the neighbor base station(s) based on event or periodically. For example, in the condition of an event occurs, such as the aerial UE accesses the network, or starts the DL/UL data transmission, the serving base station distributes the X2 signaling. For another example, the serving base station may periodically check whether there are aerial UEs having DL/UL data transmission and that create and distribute corresponding X2 signaling.

If the judgment of step 310 is NO, the base station is not the serving base station. Then the method goes to step 350.

In the step 350, the non-serving base station receives X2 signaling from previous base station, such as the serving base station.

In step 360, the non-serving base station stores the UL interference detection related information and preferably stores the aerial flying related information.

In step 370, the non-serving base station updates the distribution information. The update includes updating the distributed base station information. The non-serving base station updates the distributed base station information with the base stations that are expected to distribute. From the view of the next distributed base station, the base stations that are expected to distribute become the base stations that have been distributed.

The update of the distribution information also includes the update of the distribution level information. In particular, the current level is increased by 1, and the total level is kept unchanged.

In step 380, the non-serving base station checks whether to stop. X2 signaling distribution based on the distribution information and/or the aerial flying related information. There are several ways to make the check so that the X2 signaling distribution is stopped at step 390. The first way uses the distribution level information. After the increasing of the current level by 1 in step 370, the non-serving base station compares the current level with the total level. In the condition that the current level is equal to the total level, the non-serving base station will stop the distribution.

Alternatively, the non-serving base station may use the time stamp information. In one embodiment, the non-serving base station may stop information distribution in the condition that a long time (e.g. 1 hour) has passed from the time stamp to the current time. In another embodiment, the non-serving base station compares the current time with the sum of the time stamp and the valid timer. In the condition that the current time is greater than the sum, the non-serving base station may stop the information distribution.

Incidentally, the non-serving base station may additionally or alternatively choose to stop the distribution based on the aerial flying related information.

If the judgment in step 380 is not to stop the information distribution, the method goes to step 395, in which the non-serving base station distributes the X2 signaling to target neighbor base stations. In particular, the non-serving base station distributes the X2 signaling the next level base stations that have X2 interface and have not been distributed by previous base station. As described above, the aerial flying related information can also help the non-serving base stations determine how to distribute the assistant information. For example, the non-serving base station may choose to only distribute information to base stations that are near the flying path or in the flying direction of the aerial UE. That is, even if a base station has a X2 interface and has not been distributed by previous base station, the non-serving base station may choose not to distribute the information to said base station that is not near the flying path or is not in the flying direction of the aerial UE.

Figure 4:
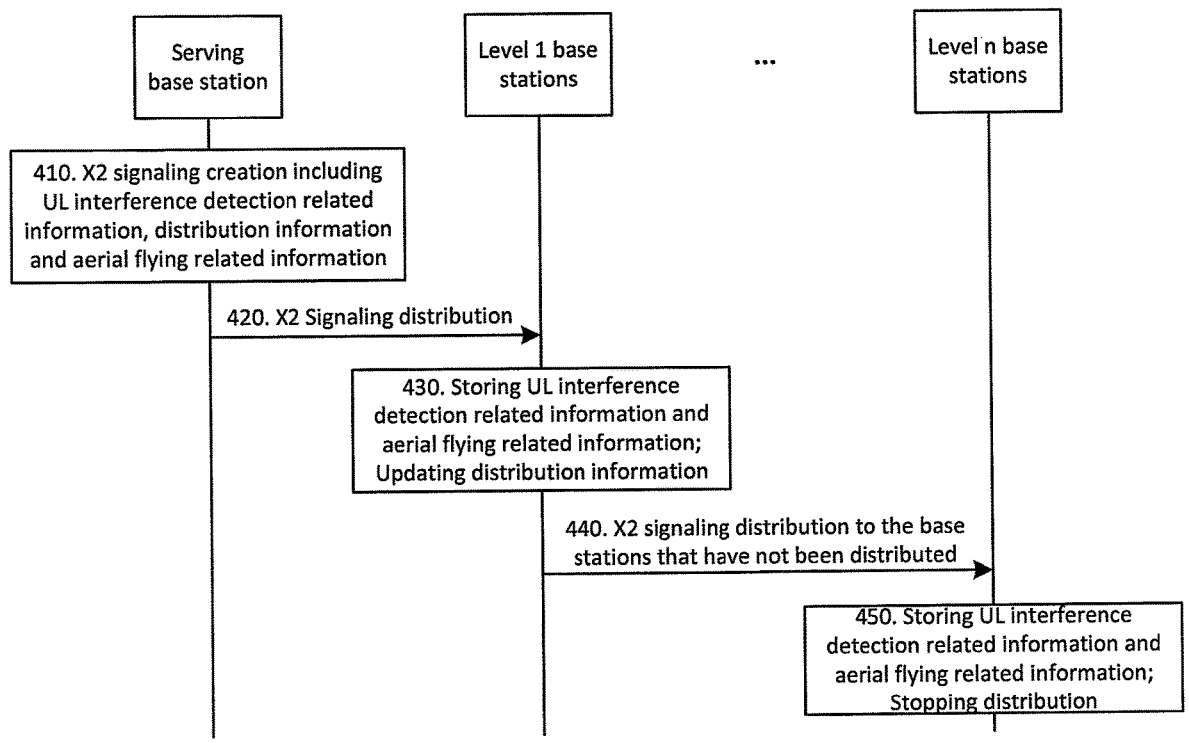
FIG. 4 is a schematic diagram illustrating one embodiment of signaling distribution.

FIG. 4 illustrates the signaling distribution. In FIG. 4, the base stations are divided into a serving base station, level 1 base stations and level n base stations, in which n is an integer greater than 1. As can be seen from FIG. 4, the level 1 base stations continue the X2 signaling distribution while the level n base stations do not distribute the X2 signaling. As will be discussed later, n may be equal to 1.

In step 410, the serving base station performs the same procedure as steps 320 and 330.

In step 420, the serving base station performs the same procedure as step 340. The level 1 base station (i.e. the non-serving base station) performs the same procedure as step 350.

In step 430, the level 1 base station (i.e. the non-serving base station) performs the same procedure as steps 360 and 370.

The step 440 may be optional. Depending on the check result of the step 380, the level 1 base station (i.e. the non-serving base station) chooses to stop X2 signaling distribution (in step 390) or distribute X2 signaling to next level base stations (in step 395). The step 440 is basically equal to step 395.

On the other hand, if the level 1 base station (i.e. the non-serving base station) chooses to stop X2 signaling distribution, the step 440 will not be performed. In this condition, the level 1 base station will become the level n base station that does not distribute the assistant information any more.

In the step 440, the level 1 base station distributes the X2 signaling to level 2 base stations. If the level 2 base station chooses to stop the X2 signaling distribution based on the distribution information, the level 2 base station becomes the level n base station. On the other hand, if the level 2 base station chooses to continue the X2 signaling distribution based on the distribution information and/or the aerial flying related information, the level 2 base station will perform the same procedure as the level 1 base station.

In step 450, level n base stations will store the UL interference detection related information and the aerial flying related information, and stop distribution of X2 signaling based on the distribution information and/or the aerial flying related information.

According to this embodiment, the UL interference detection related information is distributed, via an X2 interface, from the serving base station to level 1 to level n base stations, including faraway base stations. Each base station is expected not to receive multiple identical copies of the UL interference detection related information. Further, the base station can know when to stop the distribution of the UL interference detection related information. Therefore, redundancy information distribution is avoided, and the signaling exchanged on the X2 interface is minimized.

Figure 5:
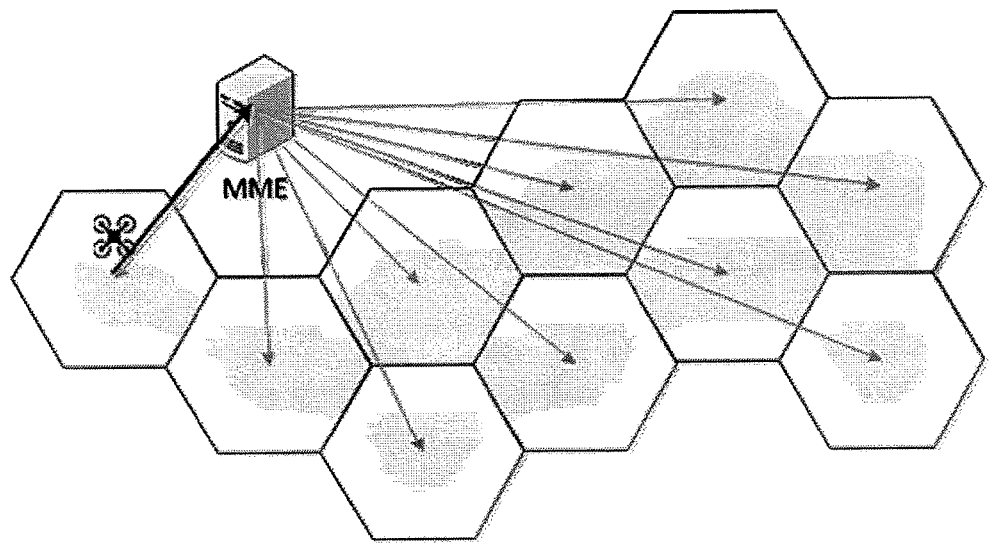
FIG. 5 is a schematic diagram illustrating another embodiment of exchanging UL interference detection related information.

FIG. 5 depicts another embodiment of exchanging UL interference detection related information. In this embodiment, the UL interference detection related information is exchanged between base stations and the control node with S1 signaling. Unlike the embodiment illustrated in FIG. 2, in the embodiment of FIG. 5, all serving base stations prepare and send the assistant information to the control node via S1 signaling. Afterwards, the control node distributes necessary UL interference detection related information to target base stations.

Figure 6:
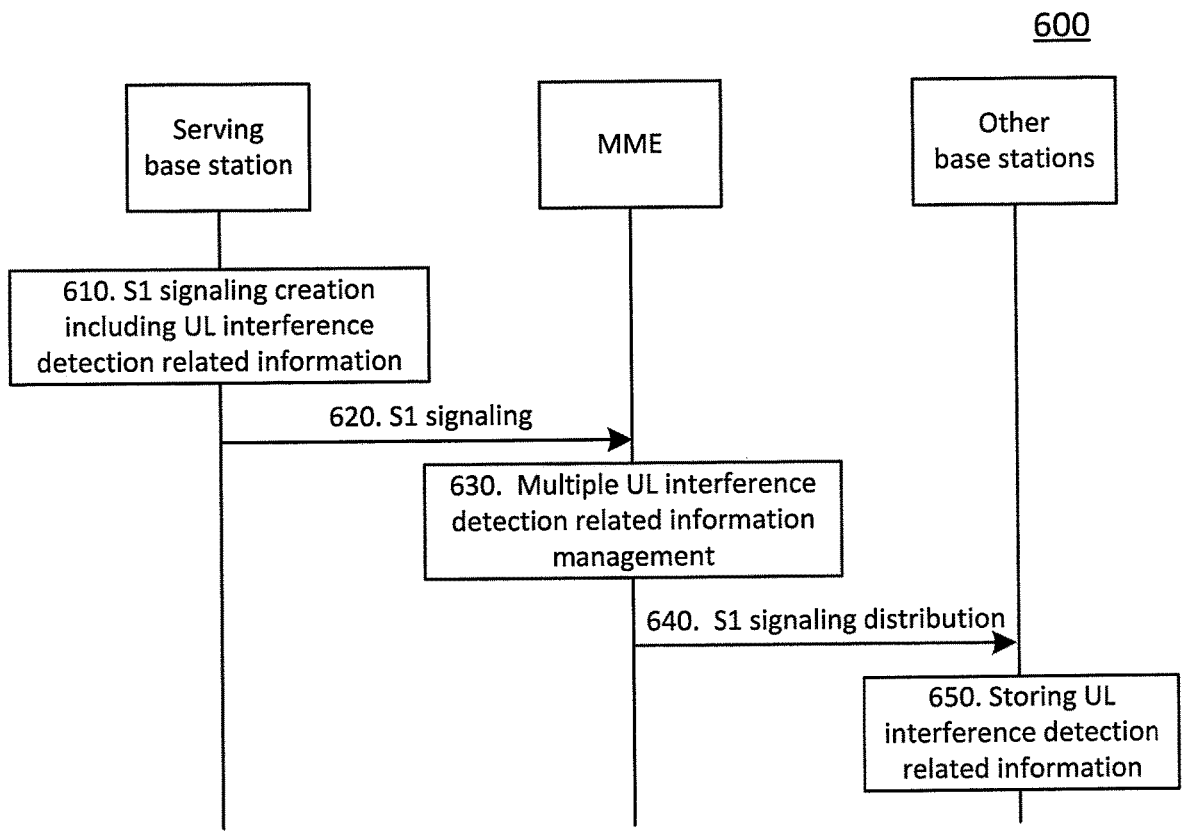
FIG. 6 is a schematic diagram illustrating another embodiment of signaling distribution.

FIG. 6 illustrates the signaling distribution according to the embodiment of FIG. 5.

In step 610, the serving base station creates S1 signaling between the serving base station and the MME, and fills the S1 signaling with UL interference detection related information and preferably aerial flying related information, in addition to the ID of the serving base station and the ID of the aerial UE, all of which can be referred to as assistant information.

The UL interference detection related information includes UL scheduling information for aerial UE, and such UL scheduling information can be the UL semi-persistent scheduling information which includes SPS periodicity, SPS frequency and time resource etc. The UL interference detection related information further includes SRS frequency and time configuration of aerial UE, DL transmission power of base station, and any quantities reported by the UE, like RSRP/CSI-RSRP/RSRQ/RS-SINR/CSI.

The aerial flying related information also helps the neighbor base stations determine how to distribute the signaling and how long the information needs to be stored. The aerial flying related information includes but is not limited to velocity of aerial UE, flying path plan, flying direction and position information.

The velocity of aerial UE is the flying speed of the aerial UE, which can be used to help target base station determine how long the information is valid. For example, if the aerial UE is flying very slow, the assistant information may be stored longer.

The flying path plan is a planned flying path of the aerial UE, which can help the MME select distribution base stations. For example, the MME can choose to distribute information to base stations that are near the flying path.

The flying direction can help the MME select distribution base stations. For example, the MME can choose to distribute information to base stations that are in the flying direction of the aerial UE.

The position information of the aerial UE position information helps the target base station determine whether to store and use the assistant information of aerial UE. For example, if the target base station finds that the aerial UE is very far and potentially has no UL interference, the target base station may choose to abandon the received assistant information.

In step 620, the serving base station sends the S1 signaling including the assistant information to the MME based on event or periodically. For example, in the condition of an event occurs, such as the aerial UE accesses the network, or starts the DL/UL data transmission, the serving base station sends the S1 signaling. For another example, the serving base station may periodically check whether there are aerial UEs having DL/UL data transmission and create and send corresponding S1 signaling.

The MME receives S1 signaling from different serving base stations for different aerial UEs. Therefore, the MME will manage a list of assistant information for multiple aerial UEs, based on S1 signaling received from multiple serving base stations for the corresponding to aerial UEs, as shown in step 630.

In the list, each item includes, ID of the aerial UE and ID of its serving base station, the UL interference detection related information and the aerial flying related information.

In step 640, the MME distributes the list of assistant information to target base stations. The distribution of such information can be based on event or periodically. For example, in the condition that an event occurs, such as the MME receives the assistant information from a serving base station, or receives an indication of updating the UL interference detection related information, or receives an indication of removal of a particular aerial UE, the MME distributes the S1 signaling to target base stations. For another example, the MME may periodically distribute the S1 signaling.

The information list distribution can be targeted to a specific area, which includes but is not limited to: base stations belonging to the same tracking area ("TA"), or several TAs in a specific area; base stations that are near flying path of aerial UE; base stations that are in an area restricted by distance.

Figure 7:
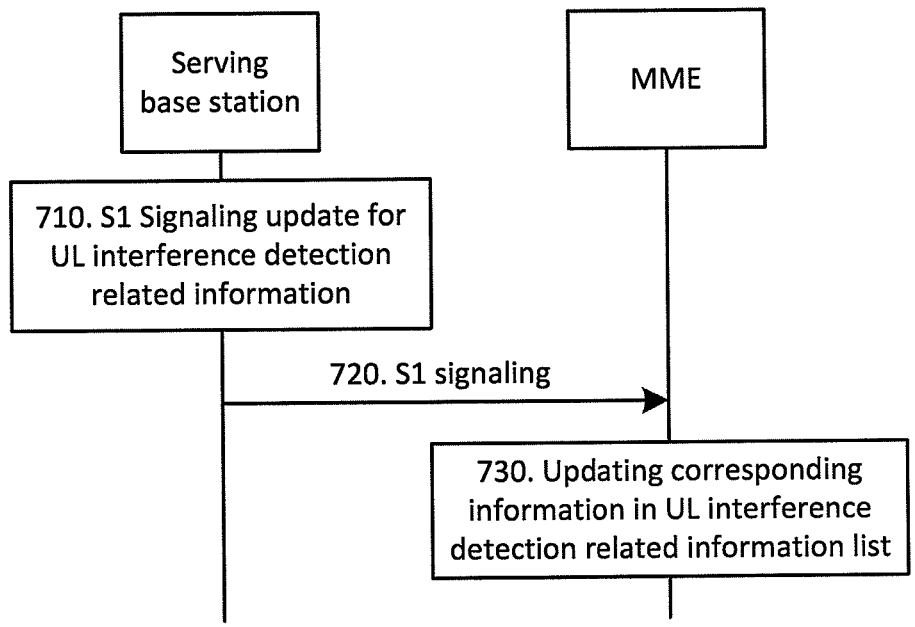
FIG. 7 is a schematic diagram illustrating another embodiment of signaling updating.

In step 650, the base stations that receive the S1 signaling store the UL interference detection related information, and preferably store the aerial flying related information FIG. 7 illustrates signaling updating.

In the condition that the UL interference detection related information for a specific aerial UE changes, for example, the UL scheduling information or the SRS configuration is changed, the serving base station of the specific aerial UE will create S1 signaling including an indication of updating the UL interference detection related information in step 710.

In step 720, the serving base station sends the S1 signaling including the indication of update to the MME.

In step 730, the MME update the information list with the received update. As described above, the MME may choose to distribute the updated list based on the event of receiving the update, or to hold the update until the periodic time limit of distribution comes.

Figure 8:
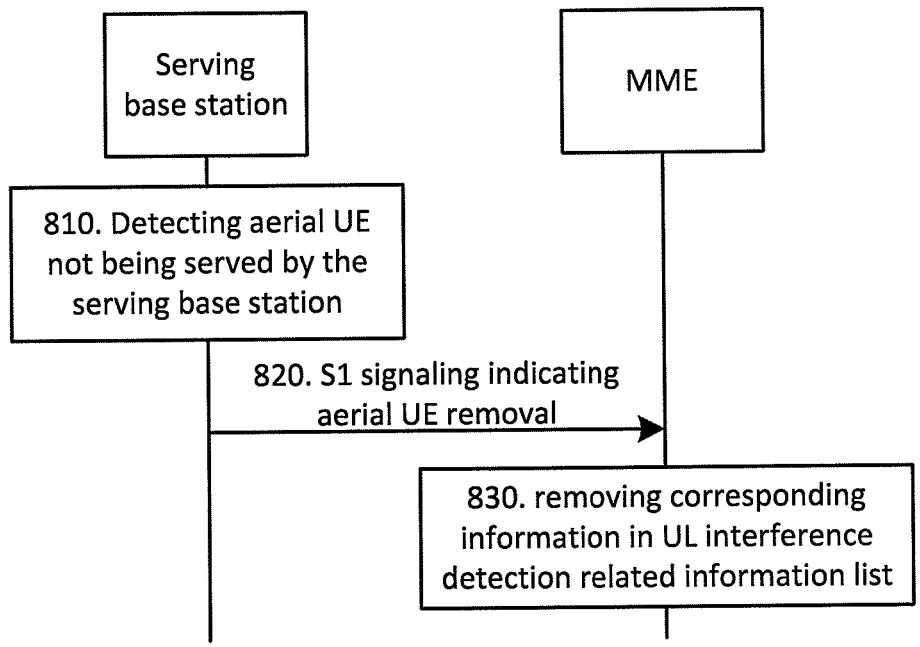
FIG. 8 is a schematic diagram illustrating another embodiment of signaling removal.

FIG. 8 illustrates signaling removal.

In the condition that a specific aerial UE is detected as not being served by its serving base station, the serving base station will create S1 signaling including an indication of removal of the specific aerial UE, in step 810.

In step 820, the serving base station sends the S1 signaling including the indication of removal of the specific aerial UE to the MME.

In step 830, the MME update the information list with the received S1 signaling including the indication of removal. As described above, the MME may choose to distribute the updated list based on the event of receiving the removal, or to hold the removal until the periodic time limit of distribution comes.

According to this embodiment, the UL interference detection related information is distributed, via a S1 interface, from the serving base station to the MME. The MME distribute the UL interference detection related information to target base stations. Therefore, redundancy information distribution among base stations is avoided, and the signaling exchanged on X2 interface is minimized.

Figure 9:
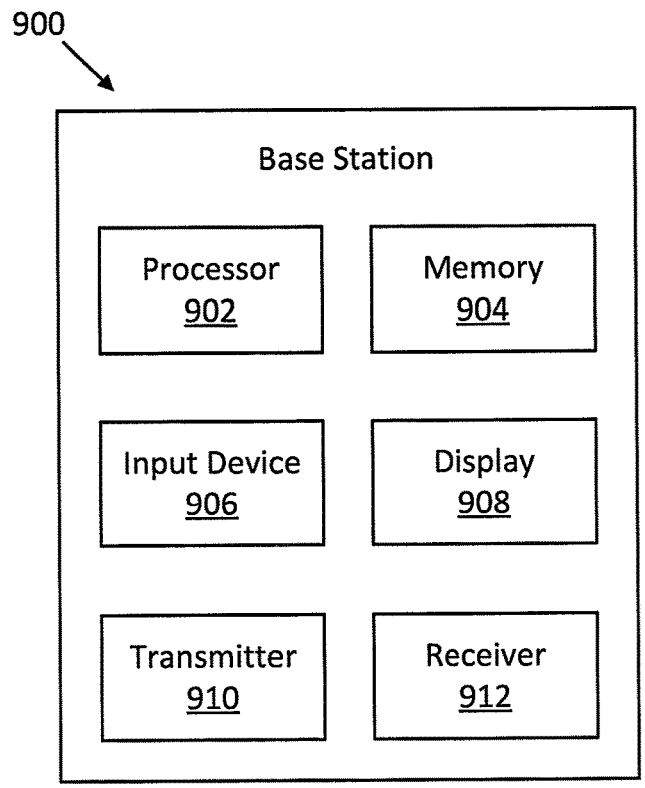
FIG. 9 is a schematic block diagram illustrating one embodiment of an apparatus that may be used for performing exchange of UL interference detection related information.

FIG. 9 depicts one embodiment of an apparatus 900 that may be used for performing the exchange of UL interference detection related information. The apparatus 900 comprises one embodiment of the base station. Furthermore, the base station may include a processor 902, a memory 904, an input device 906, a display 908, a transmitter 910, and a receiver 912. In various embodiments, the apparatus 900 may include one or more of the processor 902, the memory 904, the transmitter 910, and the receiver 912, and may not include the input device 906 and/or the display 908.

The processor 902, in one embodiment, may include any known controller capable of executing computer-readable instructions and/or capable of performing logical operations. For example, the processor 902 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 902 executes instructions stored in the memory 904 to perform the methods and routines described herein.

The memory 904, in one embodiment, is a computer-readable storage medium. In some embodiments, the memory 904 includes volatile computer storage media. For example, the memory 904 may include RAM, including dynamic RAM ("DRAM"), synchronous dynamic RAM ("SDRAM"), and/or static RAM ("SRAM"). In some embodiments, the memory 904 includes non-volatile computer storage media. For example, the memory 904 may include a hard disk drive, a flash memory, or any other suitable non-volatile computer storage device. In some embodiments, the memory 904 includes both volatile and non-volatile computer storage media. In some embodiments, the memory 904 also stores program code and related data, such as an operating system or other controller algorithms operating on the apparatus 900.

The input device 906, in one embodiment, may include any known computer input device including a touch panel, a button, a keyboard, or the like. In some embodiments, the input device 906 may be integrated with the display 908, for example, as a touch screen or similar touch-sensitive display. In some embodiments, the input device 906 includes a touch screen such that text may be input using a virtual keyboard displayed on the touch screen and/or by handwriting on the touch screen. In some embodiments, the input device 906 includes two or more different devices, such as a keyboard and a touch panel.

The display 908, in one embodiment, may include any known electronically controllable display or display device. The display 908 may be designed to output visual and/or audible signals. In some embodiments, the display 908 includes an electronic display capable of outputting visual data to a user. For example, the display 908 may include, but is not limited to being, an LCD display, an LED display, an OLED display, a projector, or similar display device capable of outputting images, text, or the like to a user. In certain embodiments, the display 908 includes one or more speakers for producing sound. For example, the display 908 may produce an audible alert or notification (e.g., a beep or chime). In some embodiments, all or portions of the display 908 may be integrated with the input device 906. For example, the input device 906 and display 908 may form a touch screen or similar touch-sensitive display. In other embodiments, the display 908 may be located near the input device 906.

The transmitter 910 is used to provide DL communication signals to the UE such as the aerial UE and the receiver 912 is used to receive UL communication signals from the UE. The transmitter 910 and the receiver 912 are also used to transmit and receive signaling to and from other base stations. Although only one transmitter 910 and one receiver 912 are illustrated, the apparatus 900 may have any suitable number of transmitters 910 and receivers 912. The transmitter 910 and the receiver 912 may be any suitable type of transmitter and receiver. In one embodiment, the transmitter 910 and the receiver 912 may be part of a transceiver.

Figure 10:
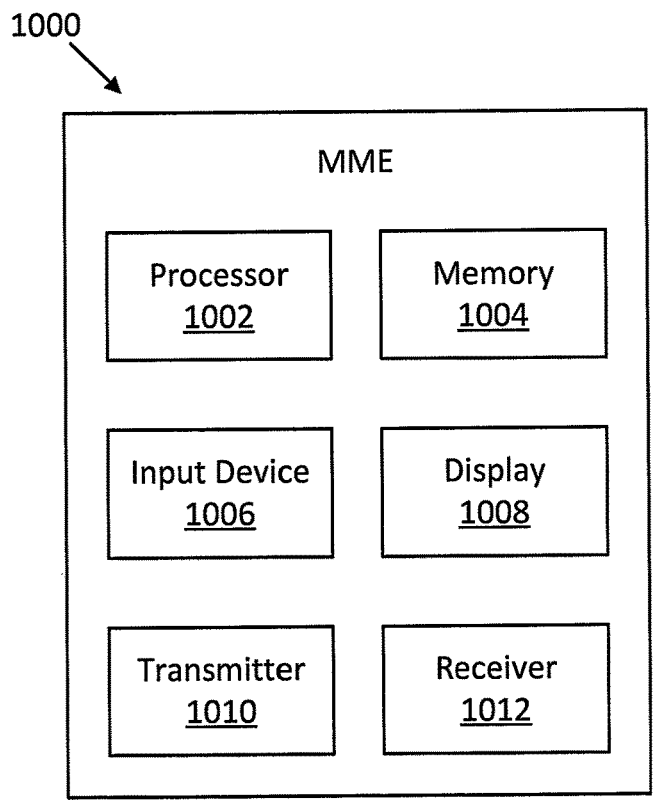
FIG. 10 is a schematic block diagram illustrating one embodiment of a control node that may be used for performing exchange of UL interference detection related information.

FIG. 10 depicts one embodiment of a control node 1000 that may be used for performing the exchange of UL interference detection related information. The control node 1000 includes one embodiment of the MME. Furthermore, the MME may include a processor 1002, a memory 1004, an input device 1006, a display 1008, a transmitter 1010, and a receiver 1012. As may be appreciated, the processor 1002, the memory 1004, the input device 1006, the display 1008, the transmitter 1010, and the receiver 1012 may be substantially similar to the processor 902, the memory 904, the input device 906, the display 908, the transmitter 910, and the receiver 912 of the apparatus 900, respectively.

In some embodiments, the receiver 1012 may be used to receive message(s) from the transmitter 910 of the apparatus 900, and the transmitter 1010 may be used to transmit message(s) to the receiver 912 of the apparatus. Although only one transmitter 1010 and one receiver 1012 are illustrated, the MME may have any suitable number of transmitters 1010 and receivers 1012. The transmitter 1010 and the receiver 1012 may be any suitable type of transmitters and receivers. In one embodiment, the transmitter 1010 and the receiver 1012 may be part of a transceiver.

Embodiments may be practiced in other specific forms. The described embodiments are to be considered in all respects to be only illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of exchanging uplink interference detection related information among base stations, the method comprising:
    receiving, at a mobility management entity (MME), uplink interference detection related information from at least one base station, wherein the uplink interference detection related information is sent from the at least one base station based on at least one aerial user equipment (UE) event for at least one aerial UE occurring at the at least one base station or is sent from the at least one base station periodically, and the at least one base station comprises at least one serving base station;
    managing, at the MME, a list of the uplink interference detection related information for the at least one base station and the at least one aerial UE, wherein the list comprises an aerial UE identifier (ID) and a serving base station ID for each base station of the at least one base station; and
    distributing the list of the uplink interference detection related information to target base stations.

2. The method of claim 1, wherein:
    the receiving uplink interference detection related information from at least one base station comprising receiving the uplink interference detection related information from a plurality of base stations; and
    the method further comprising:
        combining the uplink interference detection related information received from the plurality of base stations into an information list; and
        distributing the information list to the target base stations.

3. The method of claim 1, further comprising:
    receiving aerial flying related information from the at least one base station; and
    distributing the aerial flying related information to the target base stations.

4. The method of claim 1, wherein distributing the list of the uplink interference detection related information comprises distributing the list of the uplink interference detection related information based on an event.

5. The method of claim 1, wherein distributing the list of the uplink interference detection related information comprises distributing the list of the uplink interference detection related information periodically.

6. The method of claim 1, wherein distributing the list of the uplink interference detection related information comprises distributing the list of the uplink interference detection related information to base stations that belong to the same tracking area or several tracking areas in a specific area.

7. The method of claim 1, wherein distributing the list of the uplink interference detection related information comprises distributing the list of the uplink interference detection related information to base stations that are near flying path of an aerial user equipment.

8. The method of claim 1, wherein distributing the list of the uplink interference detection related information comprises distributing the list of the uplink interference detection related information to base stations that are in the area restricted by distance.

9. The method of claim 1, wherein, in the condition that the uplink interference detection related information is changed, an update indication is received from the at least one base station.

10. The method of claim 1, wherein, in the condition that an aerial user equipment is leaving a serving base station, a user equipment removal indication is received from the base station.

11. A control node, comprising:
    a transceiver that:
        receives, at a mobility management entity (MME), uplink interference detection related information from at least one base station, wherein the uplink interference detection related information is sent from the at least one base station based on at least one aerial user equipment (UE) event for at least one aerial UE occurring at the at least one base station or is sent from the at least one base station periodically, and the at least one base station comprises at least one serving base station;
        manages, at the MME, a list of the uplink interference detection related information for the at least one base station and the at least one aerial UE, wherein the list comprises an aerial UE identifier (ID) and a serving base station ID for each base station of the at least one base station; and
        distributes the list of the uplink interference detection related information to target base stations.

* * * * *